United States Patent

Baarfuesser

Patent Number: 5,215,009
Date of Patent: Jun. 1, 1993

[54] APPARATUS FOR CALENDERING MAGNETIC RECORDING MEDIA

[75] Inventor: Johann Baarfuesser, Gauting, Fed. Rep. of Germany

[73] Assignee: BASF Magnetics GmbH, Mannheim, Fed. Rep. of Germany

[21] Appl. No.: 849,567

[22] Filed: Mar. 11, 1992

[30] Foreign Application Priority Data

Mar. 15, 1991 [DE] Fed. Rep. of Germany ....... 4108553

[51] Int. Cl.[5] .............................................. B30B 3/04
[52] U.S. Cl. .................. 100/162 R; 118/117; 100/168
[58] Field of Search .............. 100/93 RP, 161, 162 R, 100/163 R, 166, 168, 173; 72/238, 239; 425/194, 367, DIG. 235; 118/117, 118; 156/437; 427/130, 365, 366

[56] References Cited

U.S. PATENT DOCUMENTS

| 222,081 | 11/1879 | Schlatter et al. | 100/162 R |
|---|---|---|---|
| 639,974 | 12/1899 | Harley et al. | 100/162 R |
| 1,600,119 | 9/1926 | Macklin | 425/DIG. 235 X |
| 2,404,946 | 7/1946 | Clem | 100/168 X |
| 2,696,638 | 12/1954 | Bower | 425/367 X |
| 2,868,047 | 1/1959 | Züblin | 72/238 X |
| 3,176,608 | 4/1965 | Klara et al. | 100/163 R |
| 3,194,151 | 7/1965 | Nelson | 100/173 X |
| 3,367,262 | 2/1968 | Stevens et al. | 100/168 X |
| 4,211,165 | 7/1980 | Schill | 100/162 R |
| 4,471,690 | 9/1984 | Yamaguchi et al. | 100/162 R |
| 4,632,655 | 12/1986 | Benkwitz | 100/168 X |
| 4,639,346 | 1/1987 | Pav et al. | 425/367 X |

FOREIGN PATENT DOCUMENTS

| 1113357 | 8/1961 | Fed. Rep. of Germany ... 100/162 R |
|---|---|---|
| 1561739 | 4/1970 | Fed. Rep. of Germany ... 100/163 R |
| 2801558 | 7/1979 | Fed. Rep. of Germany ...... 425/367 |
| 3416211 | 10/1986 | Fed. Rep. of Germany ...... 100/161 |

OTHER PUBLICATIONS

*Technologie der Magnetbandherstellung;* Braginskij et al.; 1981, pp. 271–274.

Primary Examiner—Stephen F. Gerrity
Attorney, Agent, or Firm—Keil & Weinkauf

[57] ABSTRACT

An improved calender apparatus for compressing and magnetic recording coating applied thereto, comprises a central roll (1) having a hard surface, around which the magnetic web is wrapped so that one side of the web bears against the central roll, while bearing against the other side of the web are at least three supporting rolls (2) which are distributed evenly around the central roll. With support roll can being rolls linearly displaced, the central roll can be swung out by a jointed lever and the web completely unthreaded. As a result, with two calender apparatuses arranged in series, cleaning of one apparatus is possible while production is not interrupted. The radius of the central roll is less than the radius of the supporting rolls, resulting in a higher linear pressure; in addition, the central roll may be made or mounted in such a way that it is flexible, in order to compensate in this way for unevennesses of the supporting rolls or of the coating.

4 Claims, 3 Drawing Sheets

APPARATUS FOR CALENDERING MAGNETIC RECORDING MEDIA

FIELD OF THE INVENTION

The invention relates to a calender for compressing and polishing magnetic coatings which have been applied to a flexible non-magnetic substrate in web form by means of a hard central roll, around which the magnetic web is wrapped with one side, while bearing against the other side of the web are at least three supporting rolls which are distributed evenly around the central roll and of which at least one can be swung away.

BACKGROUND OF THE INVENTION

Magnetic recording media essentially comprise flexible non-magnetic substrates to which there has been applied, generally on one side, a magnetic coating, which is generally of a very small thickness, usually less than 10 μm. Calendering is necessary in order to compress the magnetic layer and smooth the surface, thus accomplishing a polishing of the surface.

Apparatuses for calendering are known, in which a plurality of rolls, with or without intermediate flexible rolls, are arranged one above the other in roll mills. For example, the monograph by Braginskij Magnetic Tape Production), page 271, discloses calenders having three to nine rolls. A typical roll assembly comprises, for example, five metallic rolls and four flexible rolls, which are arranged one above the other and between which the magnetic web to be calendered is past back and forth through this arrangement, the magnetic surface constantly facing the hard metallic roll. This roll is generally heated, so that the surface of this roll may be at a temperature between 40° and 200° C. The flexible rolls usually comprise a steel core, to which a special paper, cotton, polyamide, polyurethane or a similar material is applied. Problems arise in the case of this arrangement due to excessive wear of the flexible rolls and due to the bowing of the compression rolls, this bowing being counteracted by a convexity of the roll.

DE 1,561,739 describes a freely idling central roll, arranged around which are a plurality of supporting rolls, which may or may not be adjustable with respect to one another, and the magnetic web is wrapped around the central roll. It is intended in this way to make setting of the contact pressure easier and more uniform.

DE 3,416,211 describes a similar arrangement, only in the case of this calender the central roll is fixedly mounted, as are the supporting rolls. In this case, the supporting rolls are designed as bowing-controlling rolls, on the roll surfaces of which supporting elements loaded by pressure transducers are mounted in distributed arrangement over the length, and a control device is able to set individually or in groups the pressures to be fed to the pressure transducers. In this arrangement, the central roll preferably has a larger diameter than the supporting rolls. A major disadvantage of the arrangement just described is that, to clean the central roll, the calender has to be stopped and the web unthreaded, so continuous operation is not possible.

SUMMARY OF THE INVENTION

It is an object of the present invention to provide a calender of the generic type mentioned at the beginning, with which cleaning of the central roll is possible during operation and with which a high contact pressure is ensured at the same time as minimal flexural loading of the central roll.

We have found that this object is achieved by a calender having the features mentioned in the description and the drawings.

SHORT DESCRIPTION OF THE INVENTION

The invention is now explained in further detail with reference to the Figures, in which.

Figure 3:
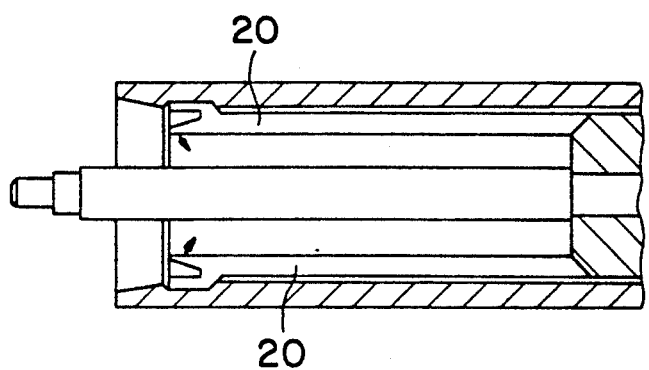
Figure 3A:
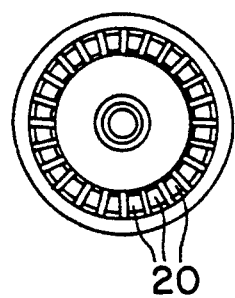

FIGS. 3 andf 3a show a flexibly supported central roll; and

Figure 4:
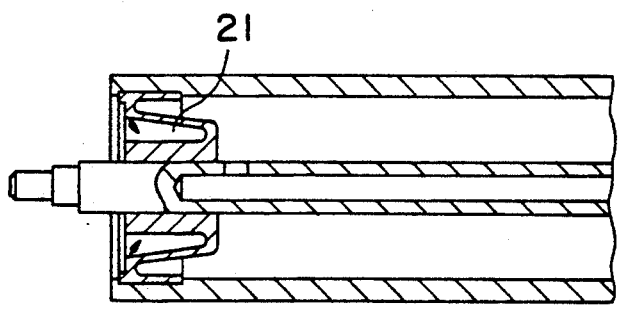

FIG. 4 shows a heated central roll with flexible side plates.

DETAILED DESCRIPTION OF THE INVENTION

Figure 1:
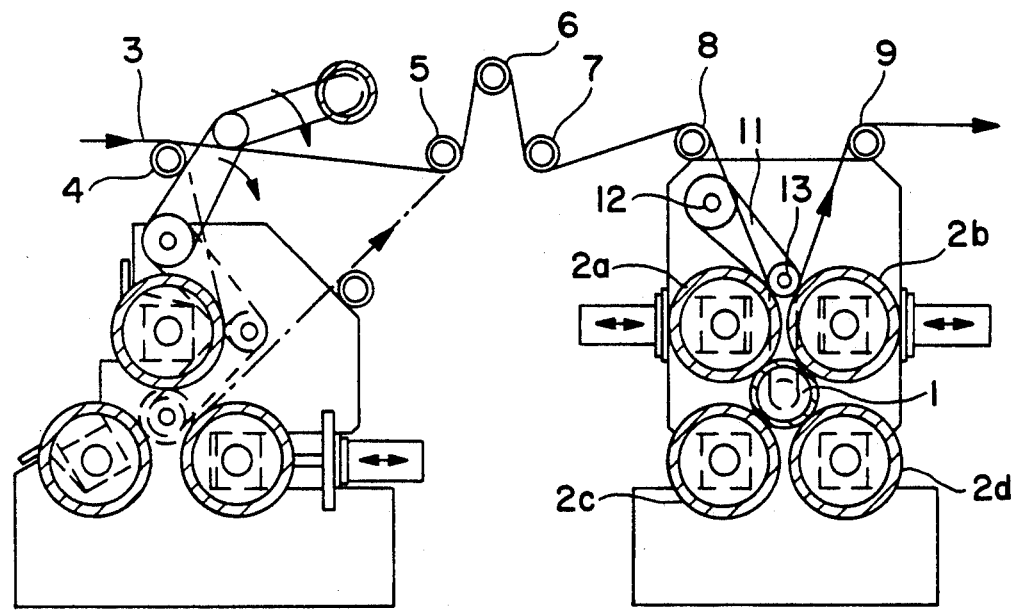
FIG. 1 shows an (unthreaded) three-nip calender, arranged in series with a (threaded) four-nip calender.

The invention permits in-line operation of an arrangement of a plurality of calenders arranged in series without switching off the coating unit and at the same time with the possibility of cleaning the calender rolls during operation of the magnetic coating and drying facilities. FIG. 1 shows an exemplary embodiment.

The magnetic web (3) comes from a coating unit (not shown) via deflector rollers (4-8) to the calender arrangement according to the invention, of which firstly the right-hand (threaded) arrangement is to be described in further detail. Arranged around a central roll (1), each offset by 90°, are four supporting rolls (2a–2d), between which the magnetic web (3) is passed, so that it wraps around a considerable part of the circumference of the central roll (1). The web is taken out from the calender apparatus via the deflector roller (9) and led to a winding means (not shown). In a preferred design, the central roll (1) is a steel roll, whereas the four supporting rolls (2a–2d) comprise a steel casing with a flexible surface. By means of the calender according to the invention, the problem of bowing of the rolls under linear pressures is solved.

The pressure-bearing area (F) of two rolls having the radii r1 and r2 and the moduli of elasticity E1 and E2, which rolls are pressed together by the force (P), is calculated from the formula $$F = \text{roll length} \times 3.04 \times \frac{P \cdot r}{2E_1 \cdot E_2 (E_1 + E_2)}$$

where $$r = \frac{1}{\frac{1}{r_1} + \frac{1}{r_2}}$$

However, in the case of the roll arrangement represented, the central roll may, since it is not subjected to any flexural loading by virtue of its symmetrical arrangement between the supporting rolls, be made small in its radius, as a result of which the effective radius (r) is correspondingly reduced. As a consequence, the pressure-bearing area is reduced and the linear pressure is correspondingly increased. The absence of flexural loading also allows the cylinder of the central roll (1) to be made very thin and flexible. It consists of metal, preferably of steel. This provides the advantage that it is possible to compensate both for the bending line of the supporting rolls and to a certain extent for the machining tolerances of the cylindrical rolls and the magnetic tape material.

As FIGS. 3 and 4 show, in the design of the central roll there is allowance in the fixing of the cylinder for an adequate flexibility, which is accomplished either, as can be seen from FIG. 3, by axially running flexible supporting elements (20) or, as in FIG. 4 in the case of a heated central roll, by flexible side plates (21).

An essential feature of the present invention is that the central roll (1) can be swung out. This takes place by means of a two-armed jointed lever (11) having the pivot point (12) and the joint (13). For this purpose, in the case of three supporting rolls (FIG. 1, left-hand part), one of the lower supporting rolls must be linearly displaced with displacing means 14, or in the case of four supporting rolls the two upper supporting rolls must be linearly displaced with displacing means 15 and 16. Then, by means of the jointed lever mentioned, the central roll is lifted out upward, as a result of which the magnetic web is unthreaded completely from the calender, whereas it remains threaded in the other calender and is thereby 1 calendered.

By means of a suitable apparatus, eg. a stepping motor or a hydraulic cylinder, the jointed lever with the removed central roll is brought upward into the virtually completely extended position. The sufficient clearance from the magnetic web thereby achieved allows the calender roll to be handled safely. In order to protect the magnetic web against soiling during the cleaning operation of the central roll, a cover may be pushed in between roll and magnetic web. The linearly displaced unit can then be cleaned very conveniently and without any risk to personnel, production at the same time continuing uninterrupted.

Once the central roll (1) has been swung into the calender, the two swivel joints (12, 13) of the lever (11) have to be deactivated in order to provide the central roll (1) between the three or four supporting rolls with the opportunity to find its suitable position with the forces acting freely.

Figure 2:
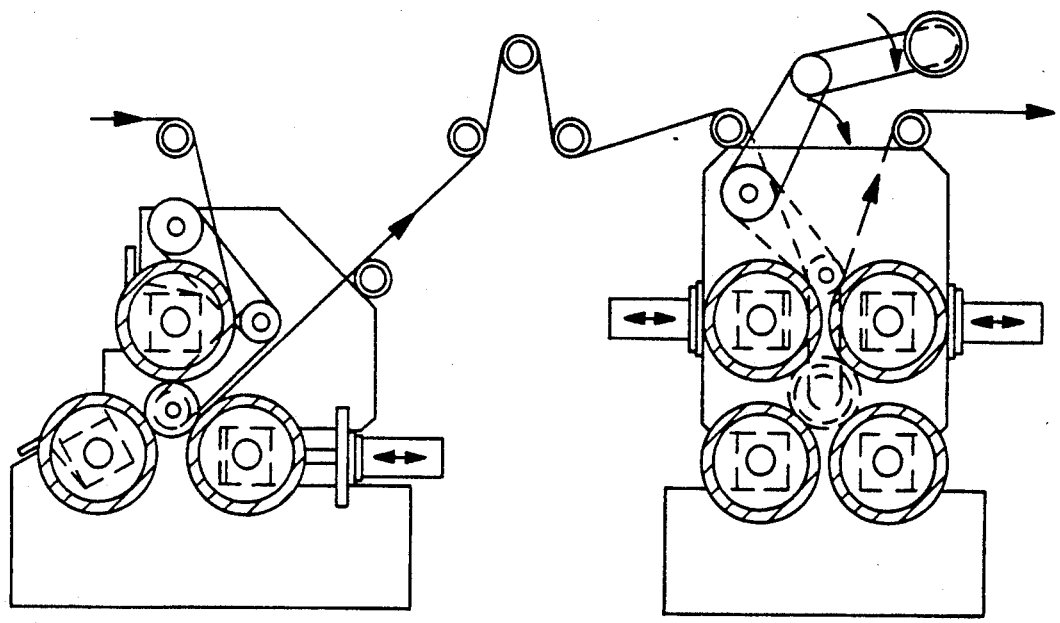
FIG. 2 shows the same arrangement but with threaded three-nip calender and unthreaded four-nip calender.

It is clear to any person skilled in the art that FIGS. 1 and 2 just show two possible combinations and that other versions are also possible. Furthermore, it is also possible for the central roll to be a roll having a flexible surface, whereas the supporting rolls are steel rolls. Furthermore, both the central roll and the supporting rolls may also consist of steel, in which case the supporting rolls are heated and the central roll, which need not be heated, can for this reason be made small and flexibly readily deformable.

By means of the calender according to the invention, there are always at least three compression nips with high linear pressure, while at the same time one calender can be cleaned. Once cleaning of a calender has been carried out, the central roll is swung in again and the supporting rolls activated, as a result of which production continues uninterrupted. Particular advantages can be achieved by means of the calender in the case of relatively long rolls, since they are affected particularly by the problem of bowing.

We claim:

1. A calender for compressing and polishing magnetic coatings which have been applied to a flexible nonmagnetic substrate web having first and second sides comprising: a support means, a central roll having a radius around which roll the web is wrapped so that the first side of the web contacts the central roll, at least three supporting rolls mounted on the support means and each supporting roll having radius, said supporting rolls are distributed evenly around said central roll and said supporting rolls bear against the second side of the web, wherien at least oen of said supporting rolls being capable of linear displacement by linear displacing means, and lever means connected to said support means and to said central roll to swing out the central roll for cleaning of its surface, whereby the web can thereby be unthreaded completely from the calender and wherien the radius of the central roll is less than the radius of each supporting roll.

2. The calender as claimed in claim 1, wherien each of the supporting rolls has a flexible surface and wherein the central roll has a hard surface.

3. The calender as claimed in claim 1, wherein each of the supporting rolls has a hard surface.

4. The calender as claimed in claim 1, wherein said lever means comprises a two-armed jointed lever and whereby with said at least one and thus completely free the magnetic web.

* * * * *

UNITED STATES PATENT AND TRADEMARK OFFICE
CERTIFICATE OF CORRECTION

PATENT NO. : 5,215,009
DATED : June 1, 1993
INVENTOR(S) : BAARFUESSER et al.

It is certified that error appears in the above-identified patent and that said Letters Patent is hereby corrected as shown below:

IN THE CLAIMS
Column 4:
Claim 1, line 26, between "having" and "radius" insert --a--.

Claim 1, line 29, "oen" should be --one--.

Claim 4, line 44, after "one" insert --supporting roll linearly displaced, the central roll can be swung out from the calender apparatus--.".

Signed and Sealed this

Eighth Day of February, 1994

Attest:

BRUCE LEHMAN

Attesting Officer     Commissioner of Patents and Trademarks